UNITED STATES PATENT OFFICE.

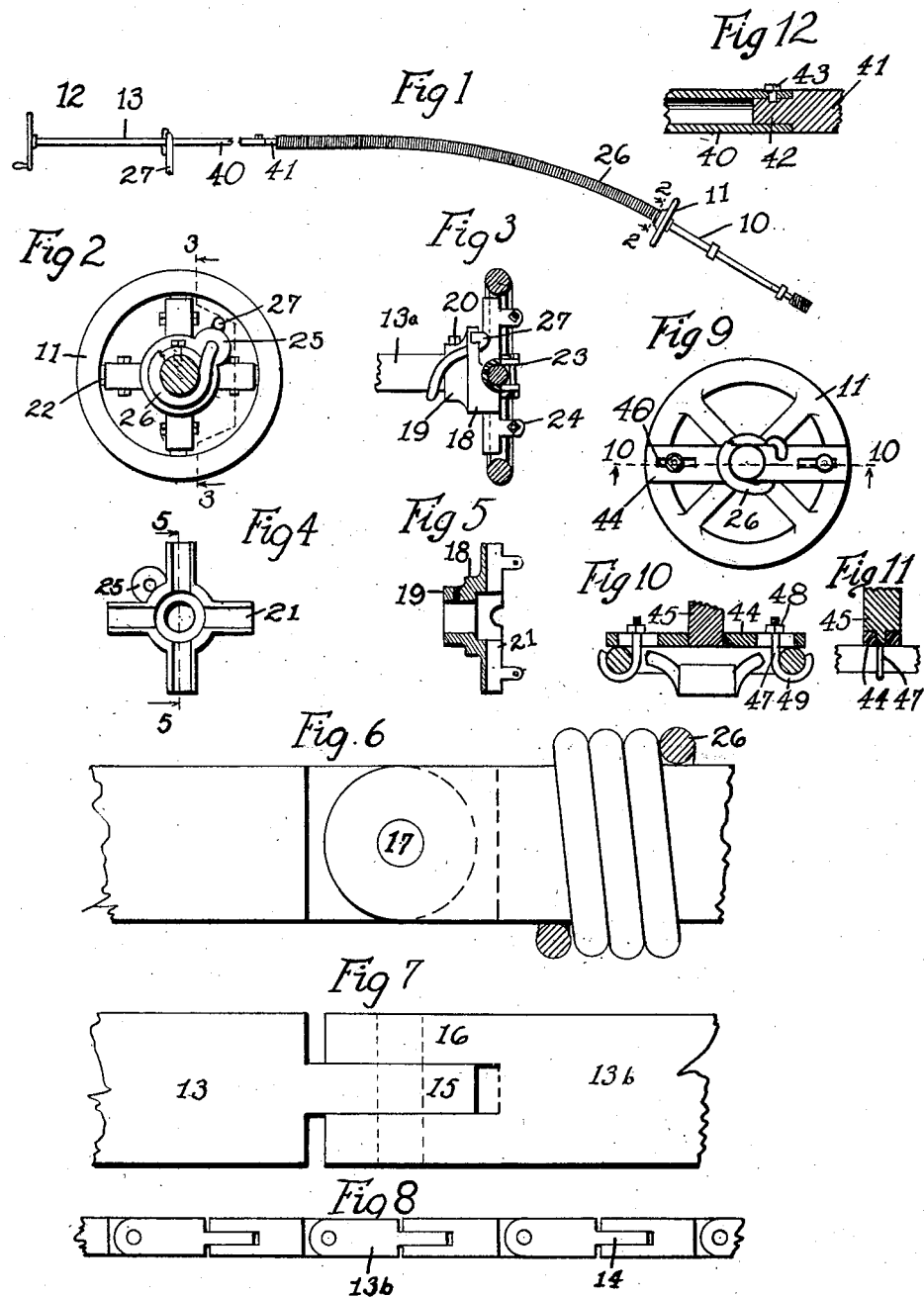

PAUL H. DASEN, OF OTTOSEN, IOWA, ASSIGNOR OF ONE-HALF TO CHRISTOPHER OTTOSEN, OF OTTOSEN, IOWA.

STEERING-ROD-CONTROLLING DEVICE.

1,313,216.  Specification of Letters Patent.  Patented Aug. 12, 1919.

Application filed October 22, 1918. Serial No. 259,263.

*To all whom it may concern:*

Be it known that I, PAUL H. DASEN, a citizen of the United States, and a resident of Ottosen, in the county of Humboldt and State of Iowa, have invented a certain new and useful Steering - Rod - Controlling Device, of which the following is a specification.

The object of my invention is to provide a steering rod operating device of simple and inexpensive construction, whereby a steering rod on a tractor may be operated away from and located at a point spaced from the tractor, said device being so constructed as to allow play between the tractor and the other machinery without affecting the control which the operator has on the steering rod.

With this and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a front elevation of a steering rod operating device embodying my invention.

Fig. 2 shows a sectional view taken on the line 2—2 of Fig. 1.

Fig. 3 shows a sectional view taken on the line 3—3 of Fig. 2.

Fig. 4 shows a plan view of one side of the device which locks on the steering wheel of a tractor.

Fig. 5 shows a sectional view taken on the line 5—5 of Fig. 4.

Fig. 6 shows an enlarged, detail view partly in section of part of the device.

Fig. 7 shows a view taken at right-angles to the view shown in Fig. 6, the spring being omitted.

Fig. 8 shows a detail view of a larger portion of the device, the spring being omitted to show the joints.

Fig. 9 shows a plan view of another form which is really my preferred form of a device for fastening the flexible shaft to the steering wheel of the tractor.

Fig. 10 shows a sectional view taken on the line 10—10 of Fig. 9.

Fig. 11 shows a sectional view illustrating the manner in which the shaft is mounted on the cross bar; and Fig. 12 shows a sectional view showing the manner of connecting the hollow tube in one of the links or shaft members.

In hauling a binder or other piece of farm machinery with a tractor I have found that if the proper steering control mechanism can be afforded, the tractor can be steered by the man who is seated on the binder, and it is possible to do away with the labor of one man.

My improved steering rod controlling device is designed for the purpose of enabling a man to sit on a binder or other piece of farm machinery and control the steering mechanism on a tractor located a substantial distance away from the binder.

In the accompanying drawings, I have used the reference numeral 10 to indicate generally a steering rod having on its upper end the steering wheel 11. The rod it is understood is designed to be connected with the steering mechanism of a tractor.

My improved attachment comprises a steering wheel 12 secured to an auxiliary steering rod 13 which extends toward the tractor.

Near the steering wheel 11 the steering rod is provided with a number of joints 14 such as those shown in Figs. 6 and 8 inclusive which may be made in any suitable way to permit each portion of the steering rod to swing in one plane with relation to the portion to which it is secured.

In the particular form of the joint shown herein, I have shown the steering rod 13 provided at one end with a longitudinally projecting shank 15 which is received between two arms 16 of an adjacent member on the steering rod and is pivoted thereto by means of a pin 17 extending through the arms 16 and the shank 15. A similar means may be employed for making several joints.

Connected with what might be called the forward portion of the steering rod, indicated in Fig. 3 by the reference numeral 13$^a$, is a device designed to be secured to the steering wheel 11 comprising a hub 18 having a socket 19 which receives the end of the rod portion 13$^a$ and is secured thereto by means of a set screw 20.

Formed on the hub 18 is a series of laterally projecting channel-shaped arms 21 which fit on the spokes 22 of the wheel 11, and may be secured in place by means of U-bolts 23 and bolts 24.

On the hub 18 is a laterally projecting lug 25 through which extends a hole.

Mounted on the jointed portion of the rod 13 is a coil spring 26, one end of which is extended through the hole in the lug 25 as at 27.

The spring 26 simply keeps the jointed portion of the auxiliary steering rod from buckling, so that any rotation of the steering rod 13 imparts rotation to the portion 13$^a$, and thence to the wheel 11 and the steering rod 10. At the same time the auxiliary steering rod may be bent to various positions for enabling it to be properly extended rearwardly to the binder or other piece of farm machinery, and for permitting the play of the parts necessary when the tractor or binder is traveling over rough ground.

The rod 13 rests upon a hanger 37 which permits rotation of the rod and also permits it to swing laterally without binding.

In Fig. 12 I have shown a hollow tubular shaft 40 with one of the link members 41 having a reduced extension 42 received in the end of the tubular member and secured thereto by means of a set-screw 43.

In Fig. 9 I have shown what is really the preferred form of my means for fastening the flexible shaft to the steering wheel 11. There is provided at the end of the shaft a cross bar 44 which is rigidly connected with the shaft member 45 on which the spring 26 is mounted. The spring 26 is secured to the cross bar 44.

The cross bar 44 has a pair of spaced, longitudinally elongated slots 46. Extended through the slots 46 are hook bolts 47 having nuts 48 on one end and having hook members 49 adapted to receive the rim of the wheel at the other end.

On account of the shape of the slots 46 the cross bar 44 can be readily and easily fastened to steering wheels of different sizes.

One of the important features of my device is the arrangement of the spring fastened at one end with relation to the shaft and arranged to turn freely with the shaft. The spring must either be fastened at the end adjacent to the steering wheel 11 or if fastened at another point some play must be allowed between the spring and the steering wheel for the reason that when the shaft is straight the spring will extend a certain distance on the shaft, whereas when the shaft is bent the spring will occupy a greater length on the shaft.

It will be seen that a device of this kind can be readily and easily applied as an attachment, and can be made at a very small expense, and when in use will save the labor of one man.

In the drawings I have used the reference numeral 13$^b$ to indicate the short joint members of the auxiliary steering rod 13.

Some changes may be made in the construction and arrangement of the various parts of my improved steering rod controlling device without departing from the essential features and purposes of my invention, and it is my intention to cover by my claims any modified forms of structure or use of mechanical equivalents which may be reasonably included within the scope of my claims.

I claim as my invention:

1. In a device of the class described; the combination of a steering wheel, an auxiliary steering device, with a flexible shaft, comprising a plurality of members pivoted together end to end, with the axes of the alternate pivots lying in planes substantially perpendicular to the planes in which the intermediate pivots lie; means for preventing buckling of said members; adjustable means at the forward end of said shaft for securing said shaft to the steering wheel; and means for securing said shaft to the auxiliary steering device.

2. In a device of the class described; the combination of a steering wheel, with an auxiliary steering wheel spaced therefrom; a flexible shaft secured at one end to the auxiliary steering wheel; means at its other end for fastening said flexible shaft to the steering wheel, said means comprising a cross bar on said shaft; elongated slots in said cross bar; hook bolts extended through said slots, said hook bolts being adapted to receive the rim of the steering wheel for operatively connecting said steering wheel with the auxiliary steering wheel.

Des Moines, Iowa, August 6, 1918.

PAUL H. DASEN.

Copies of this patent may be obtained for five cents each, by addressing the "Commissioner of Patents, Washington, D. C."